United States Patent
Morimoto et al.

(10) Patent No.: US 6,763,903 B2
(45) Date of Patent: Jul. 20, 2004

(54) AUTOMATIC STOP/ START-UP CONTROLLING DEVICE OF AN ENGINE

(75) Inventors: Kazuhiko Morimoto, Hamamatsu (JP); Yoshiaki Omata, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 167 days.

(21) Appl. No.: 10/008,212

(22) Filed: Dec. 6, 2001

(65) Prior Publication Data

US 2002/0074173 A1 Jun. 20, 2002

(30) Foreign Application Priority Data

Dec. 18, 2000 (JP) ........................................ 2000-383279

(51) Int. Cl.[7] ................................................ B60K 6/02
(52) U.S. Cl. ...................... 180/65.2; 701/22; 701/104; 477/102; 477/3
(58) Field of Search ............................. 180/65.2, 65.1; 477/186, 173, 178, 181, 102, 73, 2, 3, 5; 701/54, 99, 22, 101, 103, 112, 110; 290/40 R, 40 A

(56) References Cited

U.S. PATENT DOCUMENTS

| | | | |
|---|---|---|---|
| 4,414,937 A | | 11/1983 | Ueda et al. |
| 4,500,794 A | * | 2/1985 | Hamano et al. ........... 290/38 C |
| 5,343,970 A | | 9/1994 | Severinsky |
| 5,495,906 A | | 3/1996 | Furutani |
| 5,632,238 A | | 5/1997 | Furukawa et al. |
| 5,698,905 A | | 12/1997 | Rüthlein et al. |
| 5,839,533 A | | 11/1998 | Mikami et al. |
| 5,841,201 A | | 11/1998 | Tabata et al. |
| 5,895,333 A | | 4/1999 | Morisawa et al. |
| 5,898,282 A | | 4/1999 | Drozdz et al. |
| 5,935,040 A | | 8/1999 | Tabata et al. |
| 6,109,237 A | | 8/2000 | Pels et al. |
| 6,110,066 A | | 8/2000 | Nedungadi et al. |
| 6,135,920 A | * | 10/2000 | Kamiya et al. .............. 477/185 |
| 6,175,797 B1 | * | 1/2001 | Iizuka .......................... 701/51 |
| 6,234,932 B1 | | 5/2001 | Kuroda et al. |
| 6,251,046 B1 | * | 6/2001 | Yoshino et al. ............. 477/187 |
| 6,334,834 B1 | * | 1/2002 | Mizutani et al. ............ 477/203 |
| 6,345,216 B1 | | 2/2002 | Morimoto et al. |
| 6,348,771 B1 | | 2/2002 | Morimoto et al. |
| 6,358,180 B1 | * | 3/2002 | Kuroda et al. .................. 477/4 |
| 6,362,580 B1 | | 3/2002 | Omata et al. |
| 6,369,539 B1 | | 4/2002 | Morimoto et al. |
| 6,373,206 B1 | | 4/2002 | Morimoto et al. |
| 6,397,601 B2 | | 6/2002 | Morimoto et al. |
| 6,434,453 B1 | * | 8/2002 | Kuroda et al. ................ 701/22 |
| 6,443,126 B1 | | 9/2002 | Morimoto et al. |
| 2001/0028233 A1 | | 10/2001 | Omata et al. |
| 2002/0021007 A1 | | 2/2002 | Morimoto et al. |
| 2002/0028726 A1 | | 3/2002 | Morimoto et al. |

FOREIGN PATENT DOCUMENTS

| | | |
|---|---|---|
| JP | 60-43145 | 3/1985 |
| JP | 60-43147 | 3/1985 |
| JP | 11-257119 | 9/1999 |

* cited by examiner

Primary Examiner—Bryan Fischmann
Assistant Examiner—Brian Swenson
(74) Attorney, Agent, or Firm—Flynn, Thiel, Boutell & Tanis, P.C.

(57) ABSTRACT

In a controlling device, the automatic stop and start-up conditions for an internal combustion engine are set to enable automatic stop/start-up control reflecting an operator's will or intention without movement of the vehicle feeling incongruous or unresponsive. The controlling device provides an automatic stop condition when all of the following conditions are satisfied (1) vehicle speed is less than a set value other than zero, (2) an idle switch is on, and (3) a gear position of the transmission is in neutral. An automatic start-up condition is satisfied when any one of the following conditions is satisfied, (1) the clutch is changed to a disengaged state from a fully or half engaged state, (2) the gear position of the transmission is in non-neutral, (3) the idle switch is off, or (4) a condition of booster negative pressure.

6 Claims, 5 Drawing Sheets

AUTOMATIC STOP/ START-UP CONTROLLING DEVICE OF AN ENGINE

FIELD OF THE INVENTION

This invention relates to an automatic stop/start-up controlling device of an engine which is able to execute an idle stop.

BACKGROUND OF THE INVENTION

Some vehicles are arranged with an automatic stop/start-up controlling device which is able to execute a so-called idle stop in order to reduce fuel consumption of an engine mounted thereon. The automatic stop/start-up controlling device of the engine controls to automatically stop the engine when a predetermined automatic stop condition is satisfied, for example when an accelerator pedal is not depressed, while the engine is driven. The automatic stop/start-up controlling device of the engine also controls to automatically start up the engine when a predetermined automatic start-up condition is satisfied, for example when a starting operation is executed, while the engine is automatically stopped.

Some vehicles are of a type commonly called a hybrid vehicle having an internal combustion engine and a motor-generator (described hereinafter as "motor") which is disposed between the engine and a clutch and is connected to an output shaft of the engine. The hybrid vehicles have improved startability of the engine by the motor regardless of having a series or parallel arrangement. In addition, some hybrid vehicles are arranged with an automatic stop/start-up controlling device which is able to execute the idle stop.

Such automatic stop/start-up controlling devices of the engine are disclosed in, for example, Japanese Patent Laid-Open No. 60-43145, Japanese Patent Laid-Open No. 60-43147, and Japanese Patent Laid-Open No. 11-257119. Such controlling device disclosed in Japanese Patent Laid-Open No. 60-43145 controls such that fuel is cut-off (a) when a throttle opening degree is less than a set value and a clutch is engaged, or (b) when the clutch is disengaged and the transmission is in neutral position, whereas the controlling device controls such that fuel is not cut-off (c) when a throttle opening degree is greater than a set value, or (d) when the clutch is disengaged and the transmission is in a position other than neutral. A controlling device disclosed in Japanese Patent Laid-Open No. 60-43147 controls such that fuel is cut-off (a) when a throttle opening degree is less than a set value and a clutch is engaged and a transmission is in the high-speed gear or in neutral, or (b) when a throttle opening degree is less than a set value and the clutch is engaged and the transmission is in a low-speed gear and engine speed is greater than a set value, whereas the controlling device controls such that fuel is not cut-off (c) when a throttle opening degree is greater than a set value, or (d) when the throttle opening degree is less than a set value and the clutch is disengaged, or (e) when the throttle opening degree is less than a set value and the clutch is engaged and the transmission is in low-speed gear and the engine speed is less than a set value. A controlling device disclosed in Japanese Patent Laid-Open No. 11-257119 controls to stop the engine of a hybrid vehicle when the clutch is disengaged and the gear position of the transmission is in a non-running position and the throttle opening degree is at substantially fully closed degree.

Since how long the engine is stopped is important in order to reduce the fuel consumption of the engine. For hybrid vehicles, conventional stop/start-up controlling devices of the engine control to stop the engine by fuel cut-off on deceleration of the vehicle, taking advantage of the startability by the electric motor in the hybrid vehicles.

However, even if an automatic stop condition is satisfied, such stop/start-up controlling devices fail to stop the engine in some cases, according to the value set for the automatic stop condition. This brings about yet further inconveniences from unstable functioning.

To obviate or minimize the above inconvenience, the present invention provides an automatic stop/start-up controlling device for an engine, having a transmission arranged with an engine mounted on a vehicle through a clutch, the controlling device controlling to automatically stop the engine when an automatic stop condition is satisfied while the engine is driven, and controlling to automatically start up the engine when an automatic start-up condition is satisfied while the engine is automatically stopped. The automatic stop condition is satisfied when all of the following conditions are satisfied, the conditions being (1) vehicle speed is less than a set value other than zero, (2) an idle switch is on, and (3) a gear position of the transmission is in neutral. The automatic start-up condition is satisfied when any of the following conditions is satisfied, the conditions being (1) the clutch is changed to a disengaged state from a fully or half engaged state, (2) the gear position of the transmission is in non-neutral, (3) the idle switch is off, or (4) a condition of booster negative pressure.

The controlling device of the present invention is provided with the automatic stop and start-up conditions of the engine set appropriately, so that the automatic stop condition precisely stops the engine and the automatic start-up condition precisely starts up the engine without delay. This arrangement enables automatic stop/start-up control reflecting the operator's driving intentions without the vehicle feeling incongruous due to start-up or shut-down of the engine. The arrangement also improves exhaust gas purification and fuel consumption performance.

DETAILED DESCRIPTION

Figure 2:
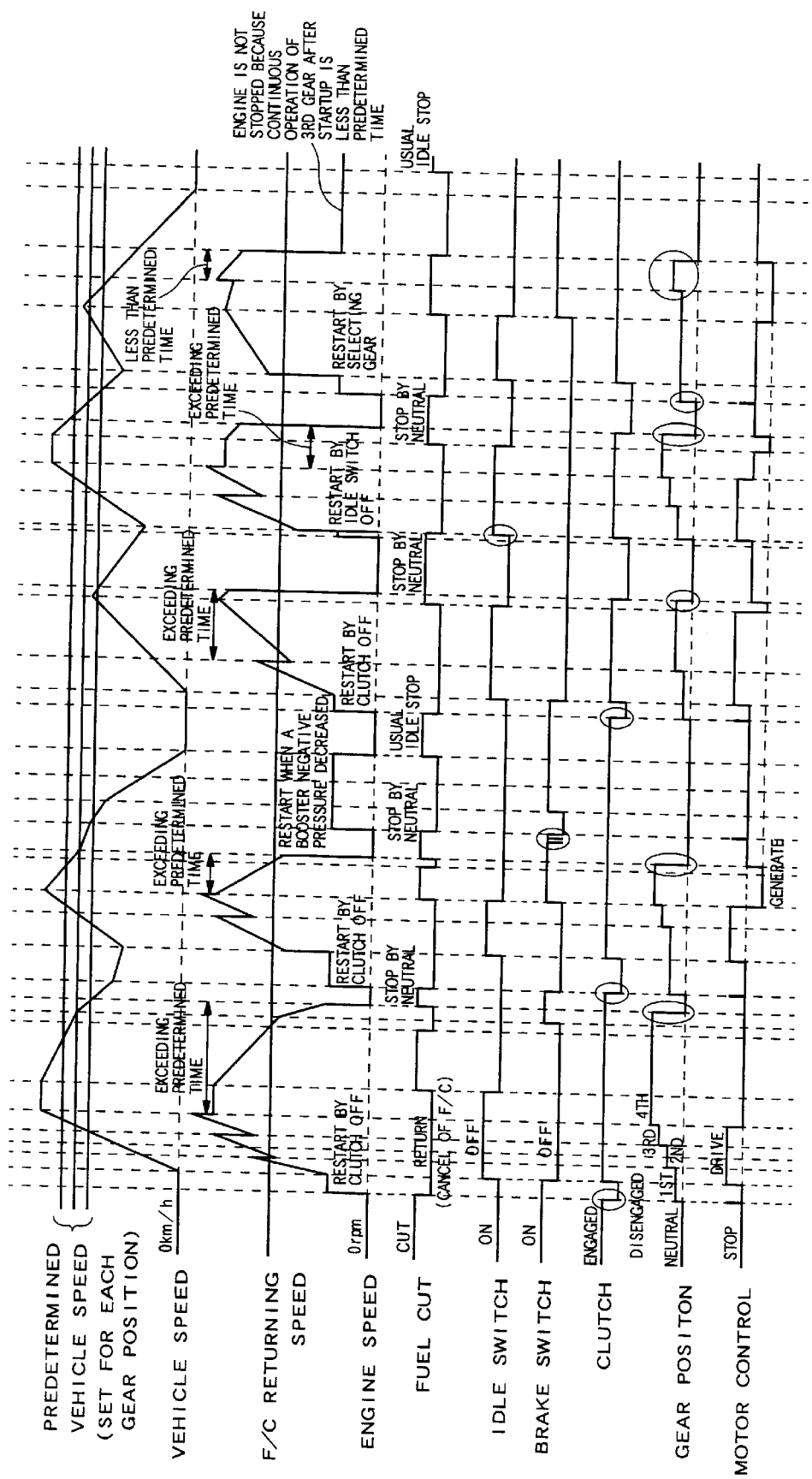
FIG. 2 is a timing chart for the automatic stop/start-up controlling.
Figure 3:
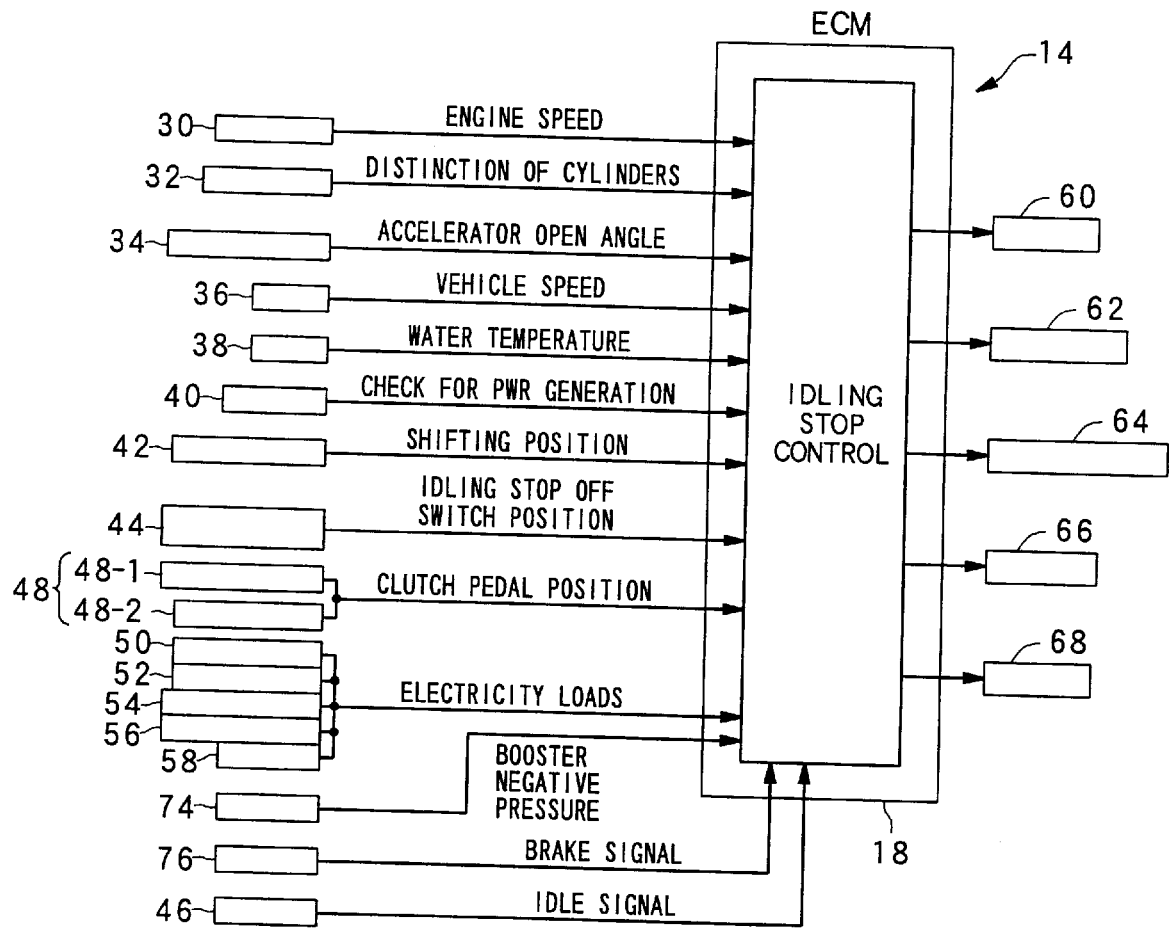
FIG. 3 is a schematic block-diagram of an automatic stop/start-up controlling section.
Figure 4:
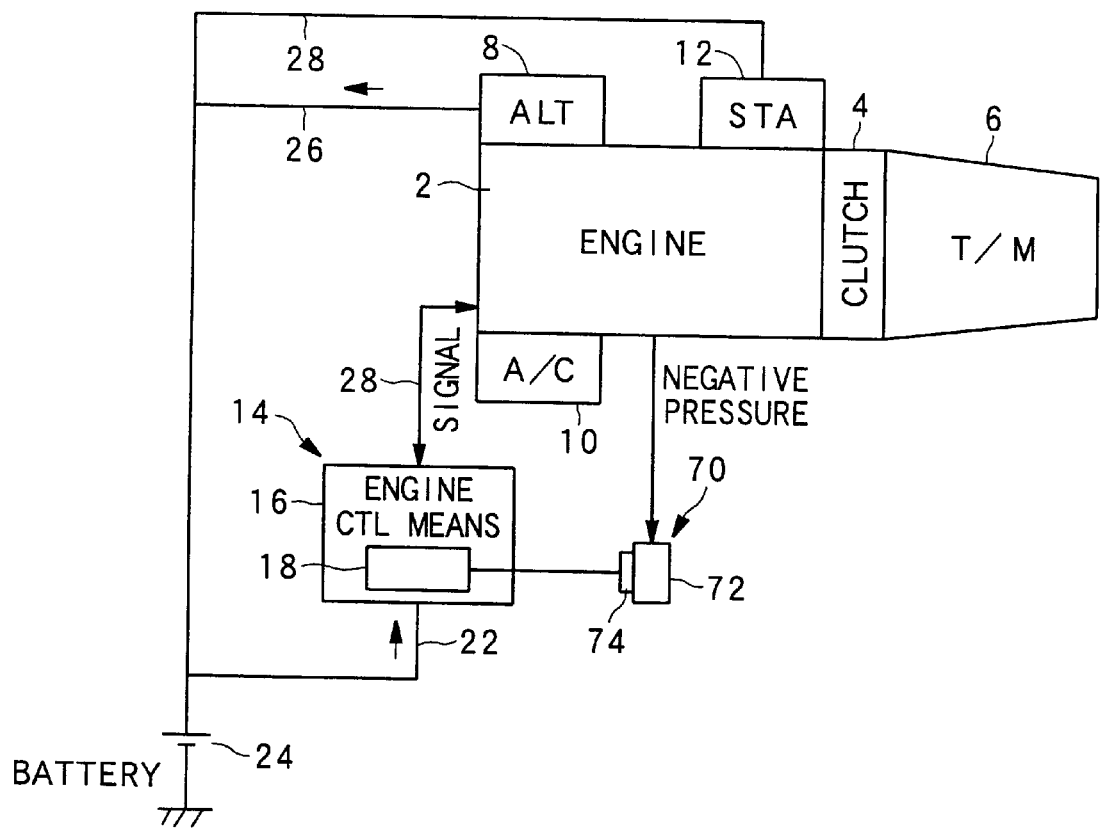
FIG. 4 is a system block-diagram of an automatic stop/start-up controlling device.
Figure 5:
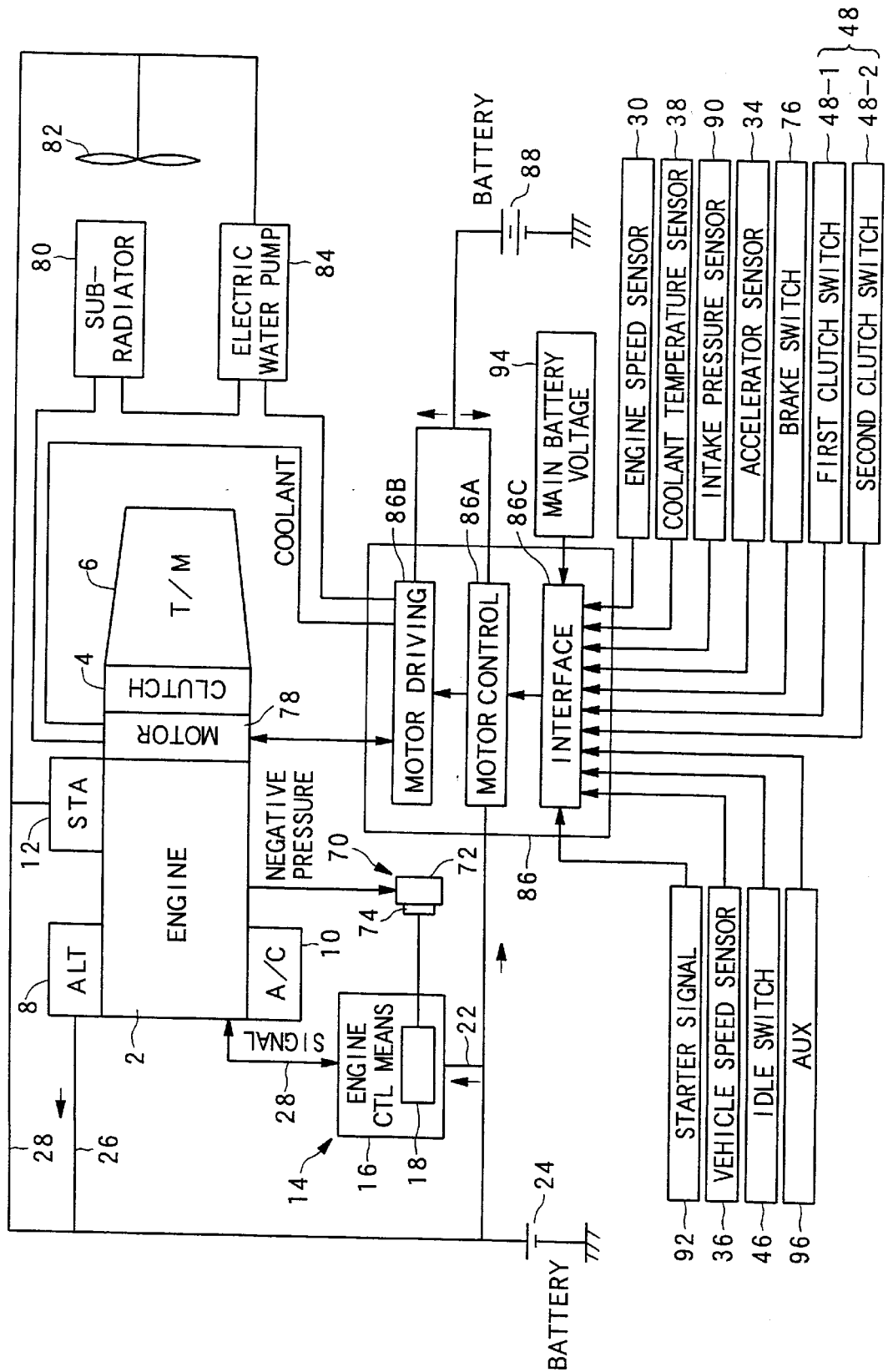
FIG. 5 is a system block-diagram of an automatic stop/start-up controlling device in a hybrid vehicle.

The present invention will now be described in specific detail with reference to FIGS. 1–5 which illustrate an embodiment of this invention. In FIG. 4, an internal combustion engine 2 is mounted on a vehicle (not shown) along with a clutch 4 and a manual transmission 6. The vehicle has a system enabling an idle stop and, for example, a motor/generator only for start-up of the engine 2 is disposed in an alternator. The transmission 6 is connected with the engine 2 through the clutch 4. The clutch 4 is disposed between the engine 2 and the transmission 6. The transmission 6 builds-in gears for more than one-speed (not shown).

The engine 2 includes an alternator 8 for power generation, an air conditioning compressor 10 for air conditioning, and a starter motor 12 for start-up. The alternator 8 and the air conditioning compressor 10 are connected to the crank shaft by pulleys and belts (not shown). The starter motor 12 is connected to the flywheel by an engageable and disengageable pinion and ring gear (not shown).

The engine 2 is controlled by an automatic stop/start-up controlling device 14. That is, the engine control means 16 which comprises the automatic stop/start-up controlling device 14, controls a driving state of the engine 2 and controls to automatically stop and start up by using an automatic stop/start-up controlling section 18 built in the engine control means 16.

The engine 2 is connected to the engine control means 16 through an engine controlling signal line 20. the engine control means 16 is linked to a battery 24 through a power line 22 for powering the engine control means. The battery 24 for the engine is coupled to the alternator 8 through a power line 26 for battery-charging and to the starter motor 12 through a power line 28 for battery-driving. The battery 24 is charged by generated electric power from the alternator 8, and supplies the electric power for driving to the starter motor 12.

The engine control means 16 includes a fuel injection controlling section, an ignition-timing controlling section, and an ISC (idle speed controlling) section (not shown). In FIG. 3, the engine control means 16 drives an injector 66 and an ignition coil/igniter (not shown) in response to the input signal from a first crank angle sensor 30 and a water temperature sensor 38 described later, and also controls a quantity of fuel injection and the ignition timing of the engine 2 according to an operating state. Referring back to FIG. 2, the engine control means 16 controls to execute fuel cut-off when an idling operating condition is satisfied and engine speed is more than a predetermined value. The control means 16 controls to return the fuel cut-off (F/C) (canceling of fuel cut-off) when the clutch 4 is disengaged or the gear position of transmission is in neutral at a vehicle speed more than a predetermined value. That is, when engine 2 is in a released state to be in an idling operating state by shifting to neutral or disengaging of the clutch, when the state of engine speed is at F/C returning engine speed, as shown in FIG. 2.

Referring to FIG. 3, the automatic stop/start-up controlling section 18 is connected at an input side to: a first crank angle sensor (equivalent to an engine speed sensor) 30 to detect engine speed; a second crank angle sensor 32 to make distinction of cylinders; an accelerator sensor 34 to detect quantity of stepping on an accelerator pedal as an accelerator-open-angle; a vehicle speed sensor 36 to detect vehicle speed; a water temperature sensor 38 to detect water temperature of the engine 2; a charge lamp 40 to check a power-generating state of the alternator 8; a neutral switch 42 to detect a shifting position of the transmission 6; an idle stop "OFF" switch 44; an idle switch 46; a first clutch switch (equivalent to a clutch upper switch) 48-1 to detect a state that the clutch pedal is slightly depressed; a second clutch switch (equivalent to a clutch lower switch) 48-2 to detect a state that the clutch pedal is substantially completely depressed; and a blower fan switch 50, a lighting switch 52, a rear defogger switch 54, a turn signal switch 46 and a windshield wiper switch 58 to detect electricity loads. The idle switch 46 is turned on when a throttle opening degree is in fully closed state. The clutch switch arrangement 48 is turned on when clutch 4 is engaged and is turned off when clutch 4 is disengaged (in the state the clutch pedal is depressed).

The automatic stop/start-up controlling section 18 is connected at an output side to a warning buzzer 60, an idle stop "OFF" lamp 62, an idle stop lamp 64, an injector 66 to inject and supply fuel to the engine 2, and a starter relay 68 to supply electric power to the starter motor 12 of the engine 2 for driving the motor.

The vehicle is provided with a negative pressure assisting-type braking device 70, as shown in FIG. 4. The negative pressure assisting-type braking device 70 takes negative suction pressure of the engine 2 into a brake booster 72 as a booster negative pressure for intensifying, thereby intensifying a brake fluid pressure generated when the brake pedal is depressed to supply the brakes (not shown) with the intensified pressure to consequently assist braking power.

Referring to FIG. 3, the automatic stop/start-up controlling device 14 is connected, at the input side of the automatic stop/start-up controlling section 18, to a booster negative pressure sensor 74 which detects booster negative pressure in the brake booster 72 of the negative pressure assisting-type braking device, and to a brake sensor 76 which detects the quantity of force applied to the brake pedal. The automatic stop/start-up controlling section 18 inputs the booster negative pressure that the booster negative pressure sensor 74 detects as an assisting power for the negative pressure assisting-type braking device 70, and then determines whether the engine 2 that was automatically stopped needs to be automatically started up to obtain the booster negative pressure equivalent to this assisting power.

The automatic stop/start-up controlling section 18 determines the automatic stop and start-up conditions from input signals resulting from the first crank angle sensor (equivalent to the engine speed sensor) 30. Then, according to the result, determines whether the automatic stop/start-up conditions are satisfied or not. While the engine 2 is driven, the controlling section 18 controls to stop/drive injector 66 and starter relay 68 to automatically stop/start up the engine. When the vehicle is stopped, before the engine 2 stops, with the clutch 4 disengaged and the gear position of transmission 6 in non-neutral, and when gear position in neutral is detected and the clutch 4 is engaged, then the controlling section 18 also controls to execute idle-stop as usual during deceleration of the vehicle.

In addition, the automatic stop condition is satisfied when all of the following conditions are satisfied, the conditions being (1) a condition of which vehicle speed is less than a set value other than zero (not including zero), (2) a condition of which an idle switch 46 is on (the throttle opening degree is in a fully closed state), and (3) a condition of which a gear position of the transmission 6 is in neutral. The automatic start-up condition is satisfied when any of the following conditions is satisfied, the conditions being (1) the clutch 4 is changed to a disengaged state from a fully or half engaged state, (2) the gear position of the transmission 6 is in non-neutral, (3) the idle switch 46 is off, or (4) a condition of booster negative pressure.

Referring to FIG. 2, set values of vehicle speed which are one of the automatic stop conditions (see "predetermined vehicle speed" in FIG. 2), are different values for each gear position of the transmission 6 (for example, three set values for three gear positions).

The engine controller 16 has an automatic stop prohibiting condition to prohibit automatic stop in each gear position while the engine 2 is driven, when continuous hours of use of each gear position of the transmission 6 do not exceed a predetermined time set for each gear position (see "predetermined time" in FIG. 2). The engine controller 16 controls to prohibit automatic stop if, as an automatic prohibiting condition, gear position of the transmission 6 is in the first-speed position or in the reverse-gear position, as shown in FIG. 2.

Figure 1:
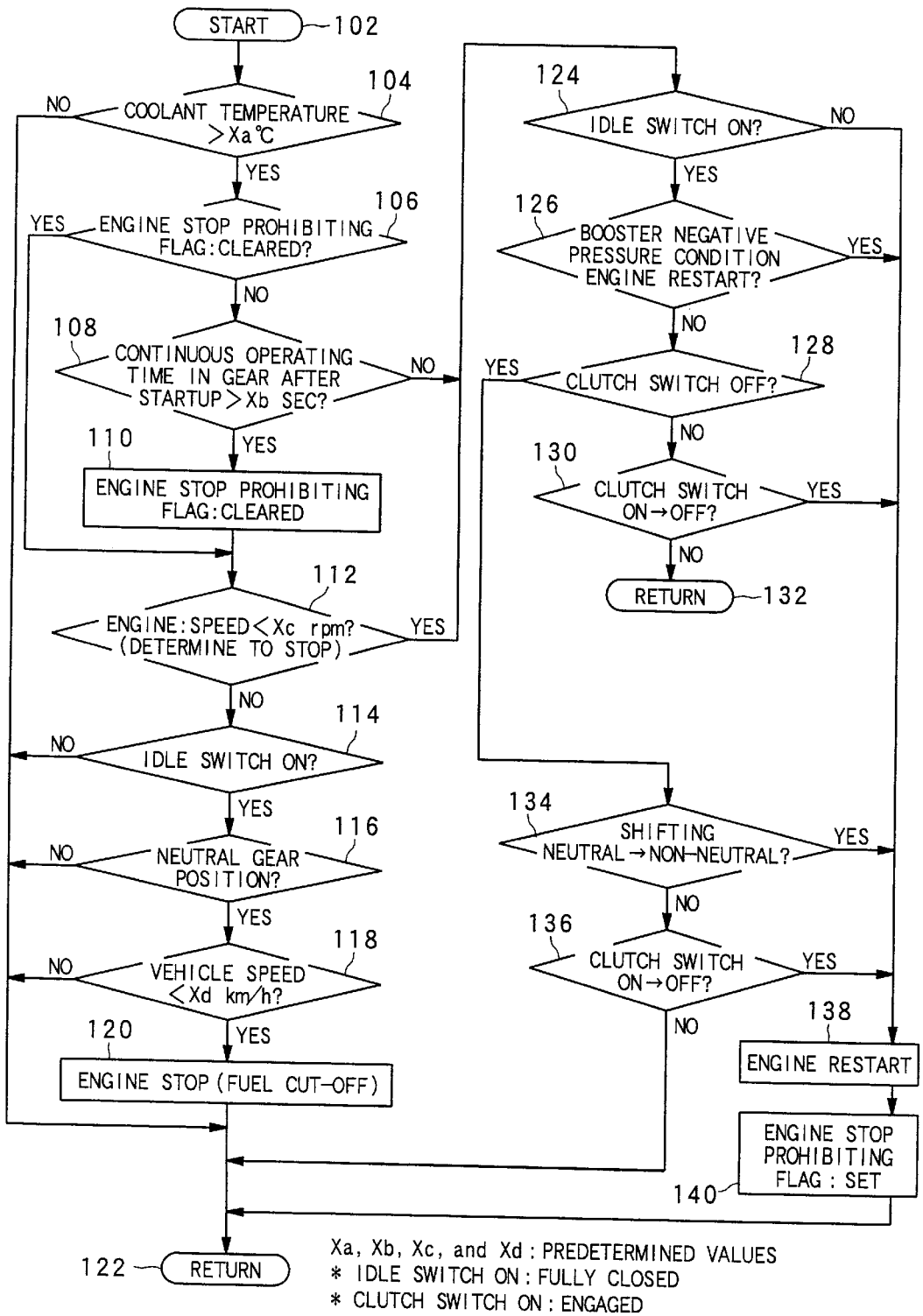
FIG. 1 is a flow chart of automatic stop/start-up controlling of an engine.

Operation of the embodiment will now be described with reference to a flowchart in FIG. 1 and a time chart in FIG. 2.

A controlling program starts at step 102. Then a determination is made at step 104 as to whether engine coolant temperature exceeds a set value When the determination in step 104 is "YES", then a determination is made at step 106 as to whether an engine stop prohibiting flag is cleared.

When the determination in step 106 is "NO", then determination is made at step 108 as to whether continuous operating time for each gear position after start-up (including restart-up) of the engine exceeds a predetermined time (see "predetermined time" in FIG. 2).

When the determination in step 108 is "YES", then the engine stop prohibiting flag is cleared at step 110.

When the engine stop prohibiting flag is cleared at step 110 or when the determination in step 106 is "YES", then determination is made at step 112 as to whether engine speed is less than a set value (whether the engine is automatically stopped).

When the determination in step 112 is "NO", then determination is made at step 114 as to whether the idle switch 46 is on.

When the determination in step 114 is "YES", that is, when a throttle opening is at fully closed degree, then determination is made at step 116 as to whether the gear position of the transmission 6 is in neutral.

When the determination in step 116 is "YES", or when the gear position is in the first-speed, the determination is made at step 118 as to whether the vehicle speed is less than a set value other than zero (not including zero).

When the determination in step 118 is "YES", then the fuel is cut-off to stop the engine 2 at step 120. In this case, operation of clutch 4 does not relate to stopping of the engine 2, and disengagement of clutch 4 is not in neutral.

When the determination in step 104, step 114, step 116, or step 118 is "NO", then the routine is returned at step 122.

When the determination in step 108 is "NO", or when the determination in step 112 is "YES", then a determination is made at step 124 as to whether the idle switch 46 is on.

When the determination in step 124 is "YES", then a determination is made at step 126 as to whether the engine 2 is stopped and a booster negative pressure condition is satisfied. For example, when the booster negative pressure decreases at a certain rate, the engine 2 is required to be restarted.

When the determination in step 126 is "NO", then a determination is made at step 128 as to whether the clutch switch 48 is off (clutch disengaged by foot pedal). Operation of the clutch 4 is one of the factors to restart the engine 2.

When the determination in step 128 is "NO", then a determination is made at step 130 as to whether the clutch switch 48 is turned off from an "ON" state, that is, the clutch 4 is changed from a fully or half engaged state to a disengaged state.

When the determination in step 130 is "NO", then the routine is returned at step 132.

When the determination in step 128 is "YES", then a determination is made at step 134 as to whether the gear is shifted from a neutral to a non-neutral position.

When the determination in step 134 is "NO", then a determination is made at step 136 as to whether the clutch switch 48 is turned off from the "ON" state.

When the determination in step 136 is "NO", then the routine is returned to step 112.

When the determination in step 124 is "NO" (the engine 2 is stopped and idle switch 46 is off), or when the determination at step 126 is "YES" (the booster negative pressure condition is satisfied), the condition of the brake switch 76 is irrelevant. When the determination at step 130 is "YES", (the clutch switch 48 is turned off) or at step 134 is "YES" (even if the clutch 4 is kept disengaged, the gear is shifted from a neutral to non-neutral position), or if the determination at step 136 is "YES" (the clutch switch 48 is turned off), then the engine 2 is restarted at step 138 (see FIG. 2), the engine stop prohibiting flag is set at step 140, and the routine is returned at step 122.

Accordingly, the automatic stop condition is satisfied when all of the following conditions are satisfied, the conditions being (1) vehicle speed is less than a set value other than zero, (2) an idle switch is on, and (3) a gear position of the transmission is in neutral. The automatic start-up condition is satisfied when one of the following conditions is satisfied, (1) the clutch is changed to a disengaged state from a fully or half engaged state, (2) the gear position of the transmission is in non-neutral, (3) the idle switch is off, and (4) a condition of booster negative pressure. The controlling device of the present invention is provided with such conditions, so that the automatic stop and start-up conditions of the engine are set appropriately, which determines the automatic stop condition precisely to stop the engine and determines the automatic start-up condition precisely to start up the engine without delay, thereby enabling automatic stop/start-up control reflecting the operator's will without feeling incongruous. Accordingly, exhaust gas purification and fuel consumption performance are improved as well.

In addition, set values of vehicle speed, which are one of an automatic stop condition or deceleration stop/fuel cut, are different values for each gear position of the transmission 6, as shown in FIG. 2. This further improves the accuracy of automatic stop/start-up controlling.

Further, the engine controller 16 has an automatic stop prohibiting condition to prohibit automatic stop in each gear position while the engine 2 is driven when continuous operation in each gear position of the transmission 6 does not exceed a predetermined time set for the respective gear position. Accordingly, when a continuous operating time in each gear position of the transmission 6 is a short time, such as during shift-up or shift-down, the controller controls to not automatically stop the engine, which is the driver's intent. Therefore, repeating between automatic stop and start-up in a short time period does not occur, which maintains ride quality.

Further, the engine controller 16 prohibits automatic stop if, as an automatic prohibiting condition, the gear position of the transmission 6 is in the first-speed position, which can avoid automatic stop in the first speed after starting up of the vehicle for a short time. Therefore, repeating between automatic stop and start-up in a short time does not occur, which maintains ride quality. In addition, automatic stop is not executed more than necessary, which reduces burden on the charging system (battery and generator). Incidentally, automatic stop controlling is also prohibited when the gear position of the transmission 6 is in reverse.

The present invention is not limited to the above, but is susceptible to various variations or modifications. For example, pursuant to the first embodiment, the vehicle having the engine 2 as a power source is described. Alternatively, the present invention can be applied to a hybrid vehicle having an internal combustion engine 2 and an electric motor 78 as power sources.

A hybrid vehicle (not shown) includes: an engine 2 having an electric motor-generator 78 (described hereafter as "motor") with driving and generating functions connected thereto; a sub-radiator 80, a sub-radiator fan 82, and an electric water pump 84 for cooling. A motor controller 86 controls driving and generating states of the motor 78. The vehicle has a battery 24 for the internal combustion engine and a main battery 88 for the motor 78 connected thereto.

The motor controller 86 has a motor controlling section 86A, a motor driving section 86B and an interface section 86C, and is connected to: a first crank angle sensor 30 as an engine speed sensor; an accelerator sensor 34; a speed sensor 36; a water temperature sensor 38; a first clutch switch 48-1; a second clutch switch 48-2; an intake pressure sensor 90; a brake switch 76; a starting switch 92; a main battery voltage detector 94; an idle switch 46; and an auxiliary input (AUX) 96. The motor controller 86 controls the driving and generating states of the motor 78 according to the signal input from the first crank angle sensor 30.

Accordingly, the engine 2 on the hybrid vehicle has the automatic stop/start-up conditions appropriately as in the above embodiment. Therefore, the engine controller 16 controls to stop the engine 2 by precisely determining the automatic stop condition, as well as start-up of the engine 2 without delay, by precisely determining the automatic start-up condition. Automatic stop/start-up controlling reflecting an operator's will or intent without operation of the vehicle feeling incongruous or abnormal, is achieved. Exhaust gas purification and reducing fuel consumption can be improved as well. The motor 78 as a power source can be applied as the start-up motor for automatic stop/start-up controlling without any additional components, which can simplify the construction.

In the above embodiments, in the automatic stop condition situation where the accelerator pedal is pulled back suddenly or the brake pedal is depressed suddenly, in some cases the engine stop is prohibited in order to reflect the operator's intent, which can achieve the proper running condition for the vehicle. Further, an engine stop pattern is modified according to the type of vehicle, to stop the engine. A detecting means, for example an approach sensor, is disposed around the vehicle, which also can stop the vehicle according to run/stop states of other vehicles. In this case, the vehicle is restarted when the vehicle ahead moves again. By this, automatic stop/start-up can be appropriately executed according to the position of other vehicles.

What is claimed is:

1. An automatic stop/start-up controlling device for an engine, having a transmission arranged with an engine mounted on a vehicle through a clutch, said controlling device 1) controlling to automatically stop the engine when an automatic stop condition is satisfied while the engine is driven, 2) controlling to perform a fuel cut when a deceleration condition is satisfied, and 3) controlling to automatically start up the engine when an automatic start-up condition is satisfied while the engine is automatically stopped, comprising a controller;

wherein the automatic stop condition is satisfied when an idle switch is on, a gear position of said transmission is in neutral, and the vehicle velocity is less than a predetermined velocity;

wherein the deceleration condition is satisfied when the idle switch is on, the vehicle speed is less than a set value and the transmission is in a gear position, the set value being different for each of the gear positions; and wherein the automatic start-up condition is satisfied when one of the following conditions is satisfied, the conditions being (1) said clutch is changed to a disengaged state from a fully or half engaged state, (2) the gear position of said transmission changes to non-neutral, (3) an idle switch is off, or (4) a condition of booster negative pressure is obtained.

2. An automatic stop/start-up controlling device for an engine according to claim 1, wherein said vehicle comprises a hybrid vehicle including a motor generator connected to an output shaft of the engine and disposed between said engine and said clutch, said engine comprising an internal combustion engine.

3. An automatic stop/start-up controlling device for an engine according to claim 1, wherein said controller provides an automatic stop prohibiting condition to prohibit automatic stop in each gear position when time driving said engine continuously in one of the gear positions of said transmission does not exceed a predetermined time set for each of the respective gear positions.

4. An automatic stop/start-up controlling device for an engine according to claim 3, wherein said controller controls to prohibit automatic stop or a fuel cut when, as an automatic prohibiting condition, said gear position of said transmission is in the first-speed gear position or in the reverse-gear position.

5. A vehicle comprising an internal combustion engine, a transmission connected to an output shaft of the engine through a clutch, a motor generator connected to the output shaft of the engine and disposed between said engine and said clutch, and an automatic stop/start-up controlling device which (1) automatically stops the engine when an automatic stop condition is satisfied while the engine is driven; (2) performs a fuel cut when a deceleration condition is satisfied; and (3) automatically starts up the engine when an automatic start-up condition is satisfied while the engine is automatically stopped, wherein the automatic stop condition is satisfied when (1) an idle switch is on, (2) a gear position of said transmission is in neutral and (3) the vehicle velocity is less than a predetermined velocity; wherein the deceleration condition is satisfied when (1) the idle switch is on, (2) the vehicle speed is less than a set value and (3) the transmission is in a gear position, the set value being different for each of the gear positions; and wherein the automatic start-up condition is satisfied when (1) said clutch is changed to a disengaged state from a fully or half engaged state or (2) the gear position of said transmission is shifted to a non-neutral state or (3) the idle switch is off or (4) a predetermined condition of booster negative pressure is obtained.

6. The vehicle according to claim 5, wherein said controller controls to prohibit automatic stop or a fuel cut when, as an automatic prohibiting condition, said gear position of said transmission is in the first-speed gear position or in the reverse-gear position.

* * * * *